United States Patent [19]

Udell

[11] Patent Number: 4,960,376
[45] Date of Patent: Oct. 2, 1990

[54] APPARATUS FOR MAKING A PLASTIC CONTAINER WITH INTEGRAL HANDLING RING

[75] Inventor: Theodore H. Udell, West Chester, Pa.

[73] Assignee: Container Corporation of America, Clayton, Mo.

[21] Appl. No.: 369,954

[22] Filed: Jun. 22, 1989

[51] Int. Cl.⁵ .............................................. B29C 49/30
[52] U.S. Cl. .................. 425/525; 220/85 D;
 220/94 A; 264/531; 425/522
[58] Field of Search .............. 425/503, 516, 517, 518,
 425/522, 525; 264/513–516, 531, 533; 215/1 C,
 100 A; 220/85 D, 94 A; 428/36.9, 542.8

[56] References Cited

U.S. PATENT DOCUMENTS

| | | | |
|---|---|---|---|
| 3,090,994 | 5/1963 | Stenger | 425/525 X |
| 3,115,682 | 12/1963 | Soubier et al. | 425/131.1 |
| 3,917,789 | 11/1975 | Heisler | 264/513 X |
| 3,960,474 | 6/1976 | Kader | 425/503 |
| 4,086,314 | 4/1978 | Lampart et al. | 264/526 |
| 4,117,062 | 9/1978 | Uhlig | 425/525 X |
| 4,378,328 | 3/1983 | Przytulla et al. | 264/534 |
| 4,659,531 | 4/1987 | Ezaki | 425/112 X |
| 4,713,207 | 12/1987 | Udell et al. | 264/515 |

FOREIGN PATENT DOCUMENTS 52-33662 8/1977 Japan ................................ 264/513

Primary Examiner—Richard L. Chiesa
Attorney, Agent, or Firm—Richard W. Carpenter

[57] ABSTRACT

Apparatus for making a thermoplastic container including a hollow, generally cylindrical body with a solid integral handling ring on at least one end thereof, wherein a solid mass of extrudate is injected from an extruder nozzle, enveloped by at least one of a pair of movable mold members, into an annular ring forming cavity of a blow mold that is in communication with a generally cylindrical body forming cavity of the mold, so when the mold is closed and a parison is blown to form a container body, the extrudate can be compressed to form an integral handling ring and the ring can be welded to the container body.

11 Claims, 4 Drawing Sheets

U.S. Patent  Oct. 2, 1990  Sheet 1 of 4  4,960,376
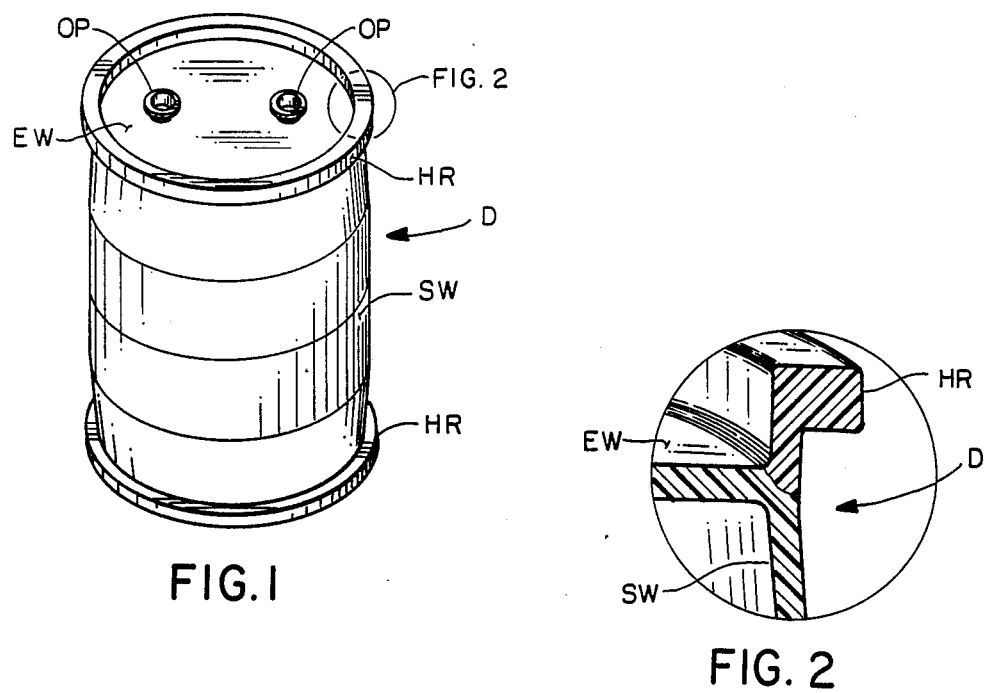
FIG. 1
FIG. 2
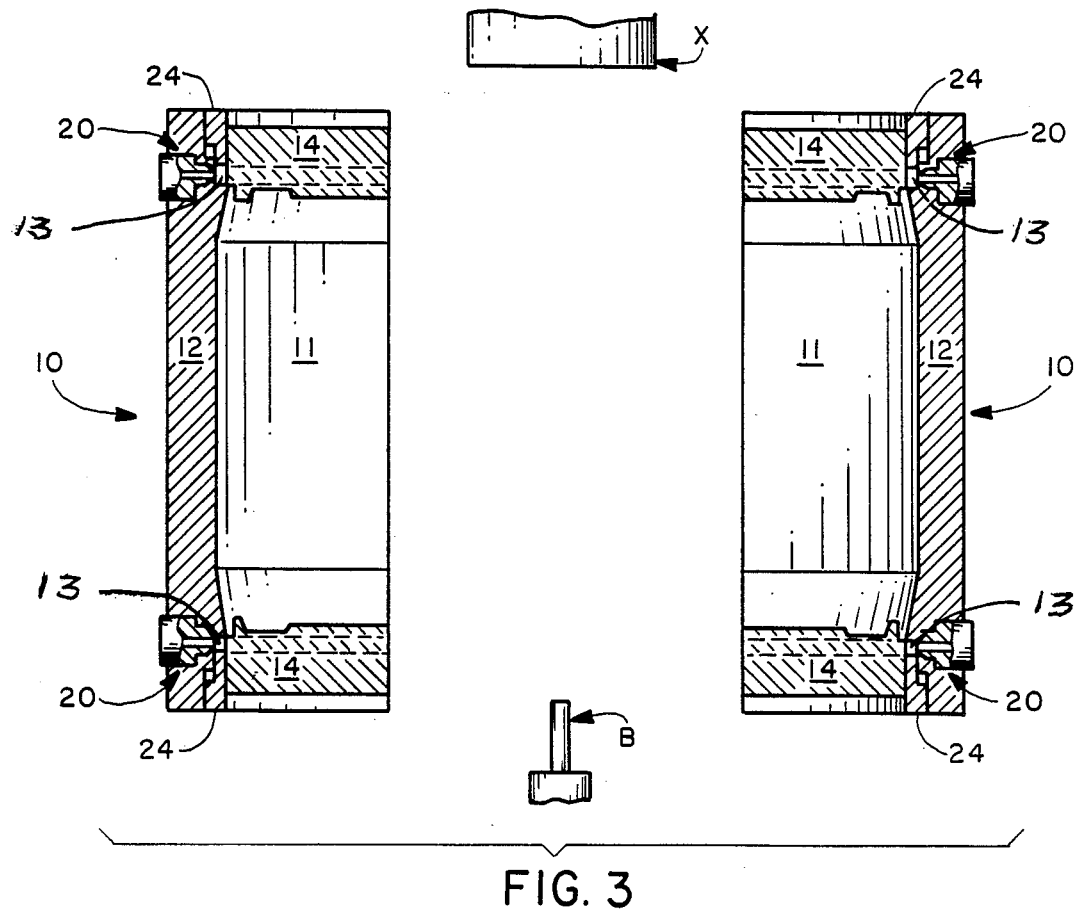
FIG. 3

4,960,376

APPARATUS FOR MAKING A PLASTIC CONTAINER WITH INTEGRAL HANDLING RING

BACKGROUND OF THE INVENTION

1. Field of the Invention:

This invention relates to large plastic containers, such as 55 gallon drums, and more particularly to an improved apparatus and method for introducing a solid mass of plastic extrudate into one portion of a blow mold and then compressing the extrudate to form a handling ring and weld it to the body of a hollow container as the container body is being formed by a conventional blow molding operation. The invention represents an improvement over the method and apparatus disclosed in U.S. Pat. No. 4,713,207.

2. Description of Background Art:

A background art search directed to the subject matter of this application conducted in the United States Patent and Trademark Office disclosed the following U.S. Pat. Nos.:

| | | |
|---|---|---|
| 2,269,010 | 2,774,992 | 3,115,682 |
| 3,790,329 | 3,849,530 | 3,960,474 |
| 4,086,314 | 4,153,408 | 4,215,089 |
| 4,228,122 | 4,378,328 | 4,529,570 |
| 4,659,531 | 4,713,207 | |

None of the patents uncovered in the search discloses apparatus and method for making a thermoplastic container, including a hollow body with a solid handling ring on at least one end thereof, wherein a solid mass of extrudate is injected, from an extruder nozzle, enveloped by at least one of a pair of moveable mold members, into an annular ring forming cavity of a blow mold that is in communication with a generally cylindrical body forming cavity of the mold, so that when the mold is closed and a parison is blown to form a container body, the extrudate can be compressed to form an integral handling ring and weld it to the container body.

SUMMARY OF THE INVENTION

It is a primary object of the invention to provide an improved apparatus and method for forming a thermoplastic container with a hollow body and at least one integral solid handling ring welded to said body.

A more specific object of the invention is the provision of an improved molding apparatus and method wherein a solid mass of extrudate can be injected into a portion of a blow mold and then compressed to form a handling ring and weld the ring to a hollow body of the container as the body is being formed by a blow molding operation.

Another specific object of the invention is to provide apparatus and method for making a container of the type described wherein the extrudate for forming the ring is injected into a mold cavity through an extruder nozzle that is enveloped by at least one of the mold members.

These and other objects of the invention will be apparent from an examination of the following description and drawings.

BRIEF DESCRIPTION OF THE DRAWINGS

FIG. 1 is a fragmentary isometric view of a plastic container formed on the apparatus of and by the method of the present invention;

FIG. 2 is an enlarged cross sectional view of a portion of the structure illustrated in FIG. 1;

FIG. 3 is a schematic side elevational view, partly in vertical section, of molding apparatus embodying the present invention, with the mold apparatus side members shown in the open position, and the end and corner sections shown in the extrudate fill position;

Figure 4:
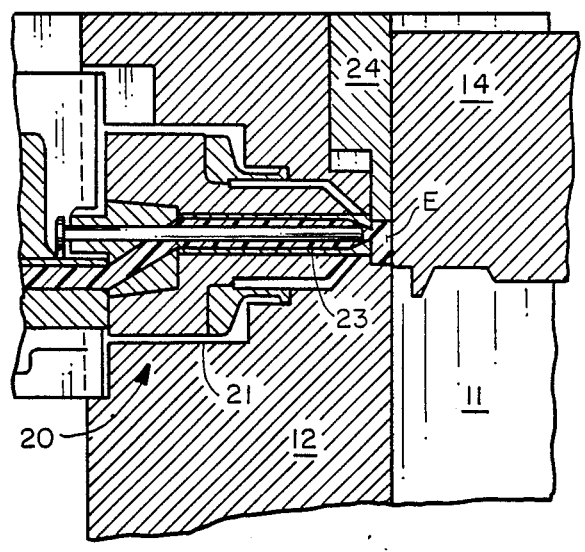
FIG. 4 is an enlarged view of a corner portion of a structure illustrated in FIG. 3, shown with the annular ring forming cavity of the mold filled with extrudate.

It will be understood that, for purposes of clarity, certain elements may have been intentionally omitted from certain views where they are believed to be illustrated to better advantage in other views.

DESCRIPTION OF THE PREFERRED EMBODIMENT

In FIG. 1 there is illustrated a container in the form of a plastic drum D which can be manufactured by the apparatus and/or the method of the present invention. The container includes a generally cylindrical hollow body having a side wall SW and a pair of end walls EW with filling and venting openings OP in one of the end wall, and solid integral handling rings HR at the upper and lower ends of the body.

It will be understood that, although in the drawings the drum is shown as having a handling ring at each end thereof, if desired a drum can be formed by the apparatus and process of the present invention with a handling ring on only one end thereof.

The novel molding apparatus embodying features of the invention includes a pair of mold members 10 which are positioned for transverss movement toward and away from each other between closed and open positions.

Figure 6:
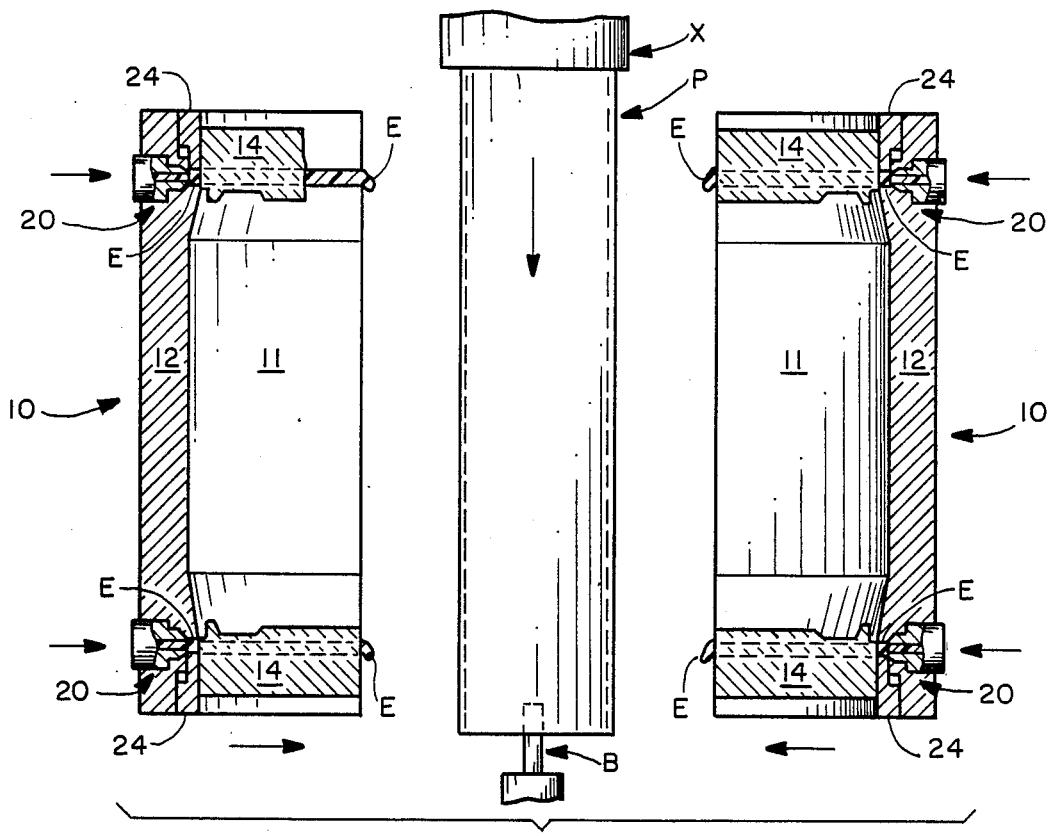
FIGS. 6, 7, and 8 are views similar to that of FIG. 3, but with the mold apparatus shown in the open preblow, closed and the open part removal positions, respectively.
Figure 7:
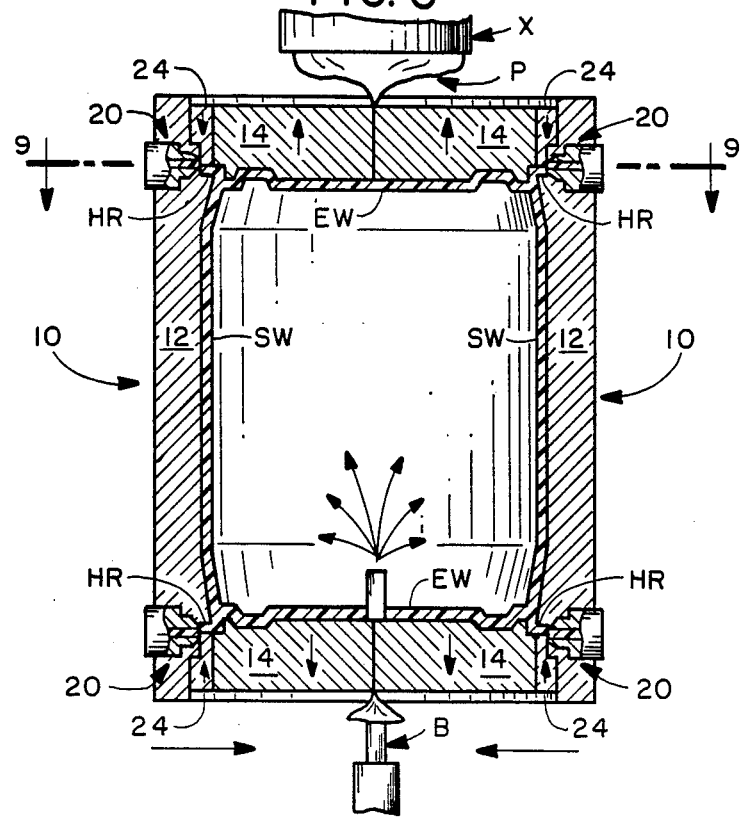
Figure 8:
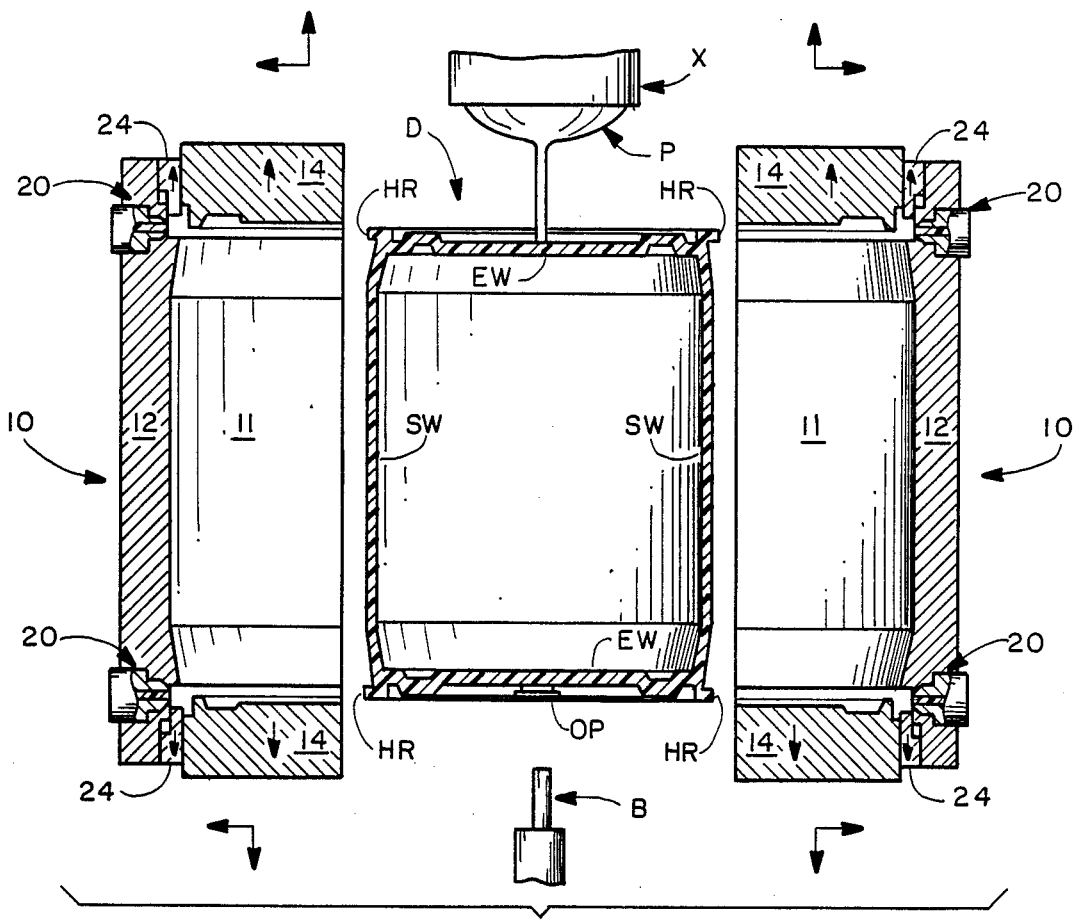

Each of the mold members includes a side section 12 having pairs of opposed end sections 14 and corner sections 24 positioned at opposite ends thereof and mounted for axial movement toward and away from the side section between fill, compression, and part removal positions, as illustrated in FIGS. 6, 7, and 8, respectively.

When in the closed position, the mold member side and end sections 12 and 14, respectively, cooperate to define a generally cylindrical main cavity 11 for forming the container body by a blow molding process. The mold member side and end sections also define, with corner sections 24, an annular cavity 13 for forming a handling ring that is both formed and welded to the container body at the same time by a compression molding process.

One of the novel features of the present invention is the manner in which the solid mass of extrudate is introduced into the annular mold cavities. At each end of the mold there is disposed, within each mold member side section, a nozzle 20 which is connected to an extruding device (not shown) that may be positioned outside of the mold apparatus.

As the extruding device may be of a conventional nature, none of its details are shown, except for the nozzles 20 which are positioned within the mold member side sections 12. Each side section has a cavity 21 contoured to receive and retain the nozzle 20 of the extruder. The nozzle includes a central bore or cavity 23, for dispensing the extrudate E into the annular mold cavity.

In order to form a container of thermoplastic material, with a hollow body and a solid handling ring, by the apparatus and method of the present invention, the mold members 10 are first moved to the open position, and the end and corner sections are moved to fill the position, as illustrated in FIG. 3.

At this point, extrudate E is injected through the nozzles 20 into the separate portions of the annular cavity 13 in each of the mold members. A sufficient quantity of extrudate is injected to completely fill each cavity portion, so that when the mold members are moved together to close the mold, a complete ring will be formed.

As clearly illustrated in FIGS. 3 and 4, when the molding apparatus is in the extrudate fill position, adjacent portions of the side section 12, the end section 14, and corner section 24 cooperate to completely close off the annular cavity ring 13 from the cylindrical main cavity 11, so the annular cavity can be filled without extrudate being inserted into the cylindrical main cavity.

After the extrudate has been inserted into the annular cavity, and while the mold is still in an open position, a hollow parison P is extruded from an extruder X positioned above the mold. When the parison has reached the lower extremity of the mold, as shown in FIG. 7, the mold members 10 are moved together to close the mold and pinch off both the upper and lower ends of the parison, and the end and corner sections of each mold member are moved to the compression position illustrated in FIG. 5.

Figure 5:
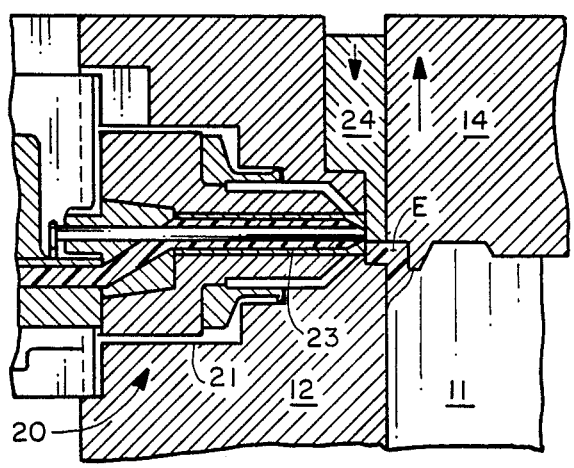
FIG. 5 is a view similar to that of FIG. 4, but with the end and corner sections of the mold shown in the compression position.

At this time, the end and corner sections are moved to the compression position shown in FIG. 5, the body of the container is formed by blowing air into the interior of the parison through the blow pipe B illustrated in FIG. 7.

Thus, at the same time the parison is being blown into the shape of the container body, the handling rings are being formed and welded to the body by compression.

After the container body and rings have been formed, the mold members 10 are moved back to the open position, and the end and corner sections of each mold member are moved axially outward to the part removal position illustrated in FIG. 8. At this point the container can be removed from the mold and the process repeated to form another container.

Figures 9, 10:
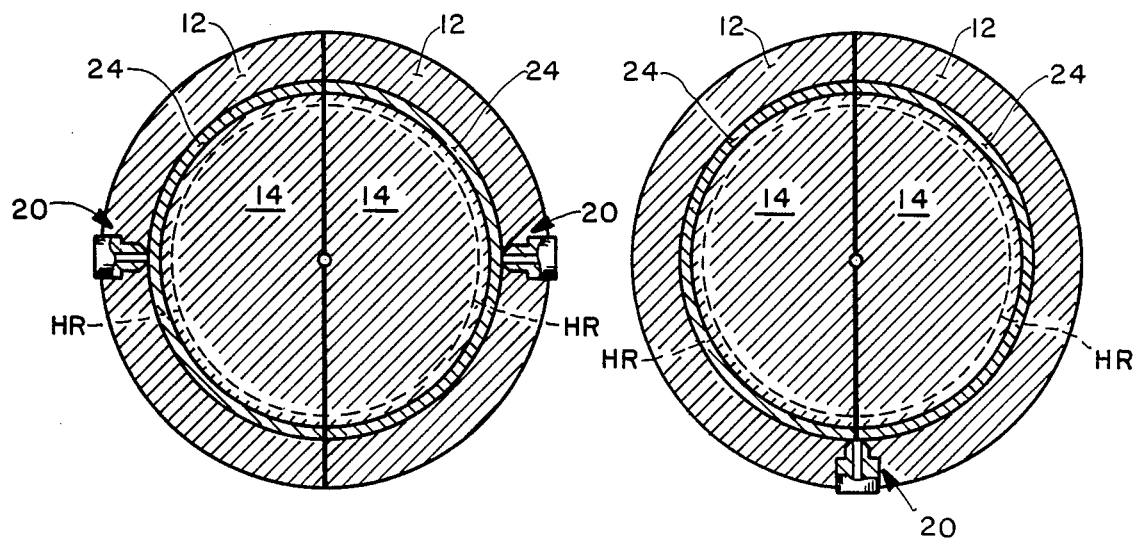
FIG. 9 is a fragmentary, horizontal, sectional view taken on line 9—9 of FIG. 7.
FIG. 10 is a view similar to that of FIG. 8, but illustrating a slightly modified form of the invention.

Turning now to FIG. 10 of the drawings, it will be seen that a slightly modified form of the invention is shown. In this embodiment of the invention, only one nozzle is employed for injecting the extrudite into each member annular mold cavity.

In this embodiment only one nozzle is used to inject the extrudate for forming each handling ring. Each nozzle is positioned between adjacent portions of the mold member side sections, with the side sections having adjacent portions hollowed out or contoured to each receive a portion of the nozzle, so the nozzle is still completely enveloped by the mold members when the mold is closed.

The operation of this apparatus and method to form a container is similar to that of the previously described apparatus and method, except that an additional step is required.

In this operation, the extrudate is injected into the mold cavity with the mold members in a closed position. After the extrudate has been injected into the annular cavity, the mold is moved to an open position and the annular mass of extrudate, not yet formed into a handling ring, is temporarily cut into separate portions which will be joined to each other when the mold is reclosed. While the mold is open, a parison is extruded between the mold members, and the mold members are moved toward each other to close the mold. At this time all of the remaining steps of the operation of the previously described embodiment can be repeated to form the container.

Thus, it will be appreciated that the invention provides a novel means of forming a container with a hollow body and solid integral handling ring which means is accomplished by introducing a mass of extrudate into the annular ring forming cavity of the mold through a nozzle which is in communication with an extruder located outside of the mold, but which is embedded within or enveloped by portions of the mold itself.

What is claimed is:

1. Molding apparatus for making a thermoplastic container including a hollow cylindrical body, formed by blow molding a hollow parison, and a solid integral handling ring, formed and welded to the body by compression molding a mass of solid extrudate, said apparatus comprising:
    (a) a pair of mold members mounted for transverse movement relative to each other between closed and open positions and each including a side section, an end section, and corner section;
    (b) said end sections being mounted for axial movement between fill, compression, and part removal positions and being positioned to cooperate with said side section to define a generally cylindrical cavity for receiving an extruded parison, to form a hollow container body, and to define an annular cavity for receiving a mass of extrudate, to form a solid integral container handling ring;
    (c) said corner sections being mounted for axial movement in said annular cavity between fill, compression, and part removal positions and being positioned to compress said extrudate to form a container handling ring and to weld said ring to said container body at the same time said body is being formed by blow molding;
    (d) said side, end, and corner sections being positioned to cooperate to close off said annular cavity from said cylindrical cavity when said sections are in the fill position;
    (e) an extruder nozzle positioned to inject a mass of extrudate into said annular cavity when said end and corner sections are in the fill position.

2. Molding apparatus according to claim 1, wherein said extruder nozzle is enveloped by at least one of said mold members, when said mold members are in the closed poisition.

3. Molding apparatus according to claim 1, wherein said nozzle is disposed between and enveloped by adjacent portions of both of said mold members.

4. Molding apparatus according to claim 1, wherein said nozzle is enveloped by one of said mold members.

5. Molding apparatus according to claim 4, wherein said nozzle is positioned to move with said one mold member.

6. Molding apparatus according to claim 1, and including a second nozzle and wherein each of said nozzles is enveloped by one of said mold members.

7. Molding apparatus for making a thermoplastic container including a hollow cylindrical body, formed by blow molding a hollow parison, and a solid integral handling ring, formed and welded to the body by compression molding a mass of solid extrudate, said apparatus comprising:

(a) a pair of mold members mounted for transverse movement toward and away from each other between closed and open positions and each including a side section, a pair of end sections, and a pair of corner sections;

(b) said end sections being mounted for axial movement between fill, compression, and part removal positions and being positioned to cooperate with said side sections to define a generally cylindrical cavity for receiving an extruded parison, to form a hollow container body, and to define an annular cavity for receiving a mass of extrudate, to form a solid integral container handling ring;

(c) said corner sections being mounted for axial movement in said annular cavity between fill, compression, and part removal positions and being positioned to compress said extrudate to form a container handling ring and to weld said ring to said container body at the same time said body is being formed by blow molding;

(d) said side, end, and corner sections being positioned to cooperate to close off said annular cavity from said cylindrical cavity when said sections are in the fill position;

(e) an extruder nozzle enveloped by at least one of said mold members, when said mold members are in the closed position, and positioned to inject a mass of extrudate into said annular cavity when said end and corner sections are in the fill position.

8. Molding apparatus according to claim 7, wherein said nozzle is disposed between and enveloped by adjacent portions of both of said mold members.

9. Molding apparatus according to claim 7, wherein said nozzle is enveloped by one of said mold members.

10. Molding apparatus according to claim 9, wherein said nozzle is positioned to move with said one mold member.

11. Molding apparatus according to claim 7, and including a second nozzle and wherein each of said nozzles is enveloped by one of said mold members.

* * * * *